United States Patent [19]
Vaughan et al.

[11] Patent Number: 5,926,207
[45] Date of Patent: Jul. 20, 1999

[54] CHANNEL SERVER FUNCTIONALITY

[75] Inventors: Mark P. Vaughan, Spring; William H. Ellis, The Woodlands, both of Tex.

[73] Assignee: Compaq Computer Corporation, Houston, Tex.

[21] Appl. No.: 08/828,993

[22] Filed: Mar. 31, 1997

[51] Int. Cl.[6] .................................................. H04N 7/173
[52] U.S. Cl. ........................ 348/13; 348/552; 348/906; 348/12; 348/553
[58] Field of Search ..................... 348/552, 553, 348/906, 910, 569, 570, 563, 564, 12, 13; H04N 7/00, 7/173

[56] References Cited

U.S. PATENT DOCUMENTS

| | | | |
|---|---|---|---|
| 5,192,999 | 3/1993 | Graczyk et al. | 358/85 |
| 5,359,367 | 10/1994 | Stockill | 348/552 |
| 5,481,296 | 1/1996 | Cragun et al. | 348/13 |
| 5,502,462 | 3/1996 | Mical et al. | 345/185 |
| 5,557,675 | 9/1996 | Schupak | 348/552 |
| 5,585,838 | 12/1996 | Lawler et al. | 348/906 |
| 5,585,866 | 12/1996 | Miller et al. | 348/906 |
| 5,721,593 | 2/1998 | Suh | 348/563 |
| 5,760,821 | 6/1998 | Ellis et al. | 348/906 |
| 5,801,787 | 9/1998 | Schein et al. | 348/906 |
| 5,822,123 | 10/1998 | Davis et al. | 348/906 |

*Primary Examiner*—John K. Peng
*Assistant Examiner*—Jean W. Désir
*Attorney, Agent, or Firm*—Jenkens & Gilchrist

[57] ABSTRACT

The present invention discloses a system for dynamically defining individual channel behavior from a variety of tuner sources within an integrated PC/TV apparatus. The system includes a channel server database including a master channel list of all channels provided by various tuner sources within a PC/TV apparatus. Each channel within the database list includes various parameters and data associated therewith defining the behavior of the channel independently of other channels within a listing. A number of channels server functionalities enable a user to dynamically access and alter the channel parameters and data to tailor channel behavior to a user's personal preferences.

28 Claims, 4 Drawing Sheets

CHANNEL SERVER FUNCTIONALITY

BACKGROUND OF THE INVENTION

1. Field of the Invention

The present invention relates to convergence devices, and more particularly, to a system providing configurable channel related information with respect to broadcast channels provided by a personal computer/television ("PC/TV") convergence device.

2. Description of the Related Art

A PC/TV convergence device is a fully functional computer integrated with television functionality, providing television (TV) viewing (via broadcast, cable, Digital Satellite, or other broadcast media) and personal computing functionalities. This convergence of computer and television functionalities provides a user with combined access to television programs and computer applications and Internet information.

Typically a PC/TV convergence device consists of a fully functional computer including fax/modems, CD-ROM players, and media storage such as hard drives and floppy drives. The computer is interfaced with a monitor, with the television's NTSC (National Television Standards Committee) interlaced signal being converted to a scan video graphics adapter (VGA) signal or the computers scan VGA signal being converted to an NTSC interlaced signal. Because the PC/TV convergence device is controlled by the computer's operating system, the PC/TV convergence device can, among other things, display PC applications and TV programs on a single monitor. The convergence of personal computer and television functionalities into a single device also permits the utilization of the communications bandwidth, mass storage and graphics of the computer to deliver, store and display applications during a traditional television viewing environment.

The PC/TV convergence device is a user interactive device. For example, if a user is watching a television program, the PC/TV convergence device will enable the user to download information about that particular program, such as from a web site where additional information about or related to the program might be located.

Existing televisions and devices containing display functionalities normally have a variety of identifiers, many of them visual, associated with the device. For example, televisions include channel sets through which a user may enter a particular channel number and then the television is tuned to a particular frequency band associated with that number identifier. This number may also be displayed on the screen of the television as the user presses it on some type of controller. A user may also scan in particular channels such that only certain channels actually provided by a local broadcast system, such as antenna or cable, are displayed to a user. Furthermore, the user may select between various options when viewing channels such as having closed captioning, providing stereo or mono capabilities, etc. However, each of these various functionalities are either in an active or inactive mode and thus are or are not associated with each of the channels.

Thus, the various capabilities and functionalities of the identifiers and functionalities associated with a particular channel or group of channels is fairly limited. Particular functionalities associated with the channels must be associated with the channels in an all or nothing basis. No system exists to enable a user to individual program channel behavior such that each channel may have unique operating characteristics associated with it that are independent of the operating characteristics of other channels.

SUMMARY OF THE INVENTION

The present invention overcomes the foregoing and other problems with a system providing channel server functionalities. In a preferred embodiment, the system is associated with an integrated personal computer and television functionalities. A database, stored within a memory of the integrated personal computer or television functionalities contains a master list of broadcast channels. Each broadcast channel has a variety of selectively programmable data associated therewith defining the behavior of the broadcast channels independently of other broadcast channels.

This master list of channels is further subdivided into list of channels associated with a particular broadcast type (e.g., NTSC cable, NTSC broadcasts, etc.) and may be further subdivided into groupings associated with a particular user, for example, a user's favorite channels. Each of the channels within the master channel list includes customizable parameters and data associated therewith. The customizable parameters and data enable a user to dynamically control various system functionalities on a channel-by-channel basis. Thus a user could have a particular logo associated with, for example, the broadcast band represented by channel 8, such that the user could access this broadcast band by entering the identifier A, B, C rather than channel 8. Furthermore, this channel could be designated as always providing closed caption services, stereo audio capabilities or secondary audio programming (SAP).

Associated with the database are user actuatable functionalities responsive to input from the personal computer functionalities for selectively programming the selectively programmable data. Through these functionalities, a user is able to set the various data and parameters associated with a particular channel or tuner to achieve desired behavior. Examples of these functionalities include, means for adding, deleting or modifying channels on particular lists, means for associating particular user selectable identifiers with a channel or list of channels or any other identifier associated with the television or PC functionalities, means for notifying a user of changes in channels and means for scanning in new channels from a newly added or reconfigured broadcast type.

BRIEF DESCRIPTION OF THE DRAWINGS

A more complete understanding of the present invention may be had by reference to the following detailed description and appended claims when taken in conjunction with the accompanying drawing wherein:

DETAILED DESCRIPTION OF THE INVENTION

With reference now to the figures that are depicted, various block diagrams illustrating the system of the present invention are presented. The purpose of these block diagrams is to illustrate the features of the invention and the basic principles of operations of embodiments thereof.

These block diagrams are not necessarily intended to schematically represent particular modules of circuitry or any particular data or control paths.

Figure 1:
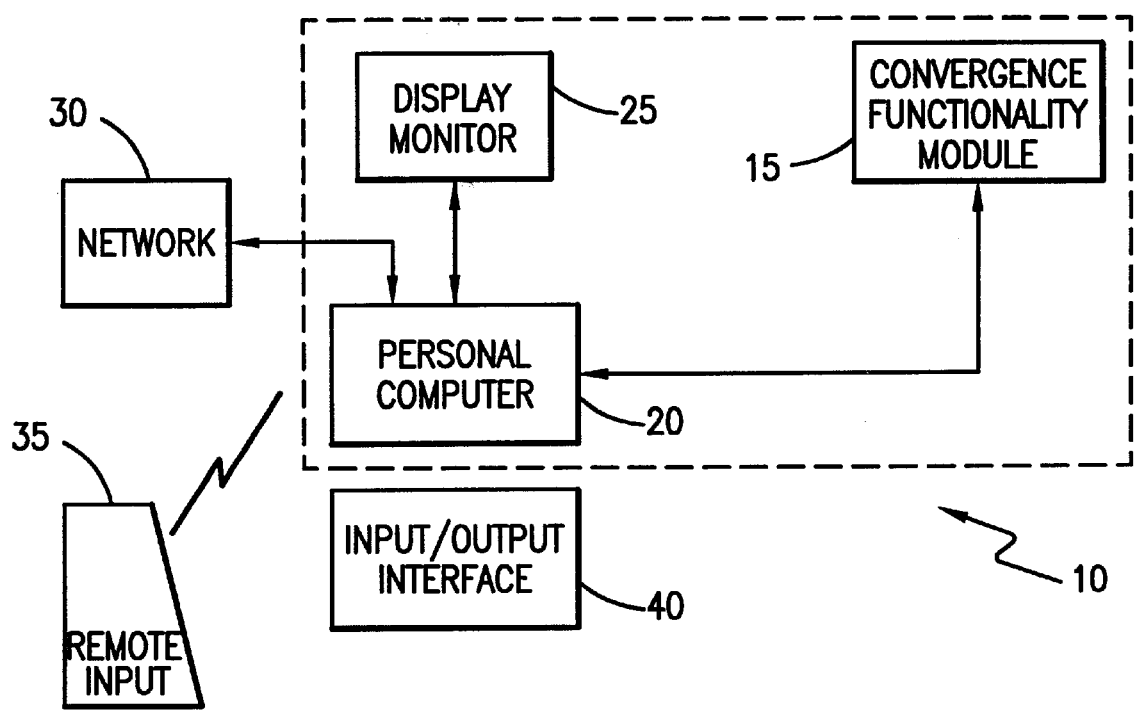
FIG. 1 is a block diagram illustrating a PC integrated with a convergence functionality module and display monitor.

Referring now to FIG. 1, there is shown a block diagram illustrating a PC/convergence functionality module convergence system 10. While the following description envisions a software implemented system, it should be realized that the described embodiments may be implemented in hardware, software, firmware or any other implementation consistent with the spirit of the invention. The convergence system 10 includes a convergence functionality module 15, a personal computer (PC) 20 and a display monitor 25. The system 10 further includes a network interface 30 enabling system access to a variety of external networks, such as the Internet; a remote control device 35 and an input/output interface 40. In general, the convergence system 10 can operate in various modes. It can be operated in a personal computer mode, it can operate in a mode according to the convergence functionality module, or in a combination thereof.

Examples of a functionalities provided by the convergence functionality module include a television or a gaming system. For purposes of discussion, the remainder of the description with respect to FIG. 1 and the remaining drawings will be with respect to a convergence functionality module operating as a television module. When the convergence system operates in a television mode, information is received from a television/video source and displayed on the display monitor 25. When the convergence system 10 operates in a personal computer mode, the personal computer 20 performs typical computer functions such as executing and running software, including playing games, and interfacing with the Internet via the external network 30. The output of the personal computer 20 is displayed on the display monitor 25.

The convergence system 10 can also be utilized in a combination mode utilizing the functionality of both the television 15 and the personal computer 20. When operating in combination mode, a user will be able to use the personal computer to interact with the television module 15. For example, during a particular television program, a user could download information about the program from the Internet. The combination mode also permits a user to watch television while interacting with the operation of the personal computer 20, such as by having a small window displaying a television show or video on the screen while also displaying normal personal computer operations on the remainder of the screen. When operating the convergence system 10 in combination mode, a user can also switch between utilizing the personal computer 20 and television module 15. For example, during commercials, a user can readily switch from watching a commercial during a television program to utilizing a computer program until the television program resumes, at which time the user could switch back to the television 15.

As further illustrated in FIG. 1, the convergence system 10 includes an input/output interface 40. Input/output interface 40 is for sending and receiving data to and from the convergence system 10. In the case of a television module 15, input/output interface 40 is for interfacing with a video source for the television module and for inputting and outputting data to and from the convergence system 10 through devices such as another television, a printer, a modem, an external disk drive and other computer and television peripherals. The remote input 35 enables a user to remotely control the personal computer 20 and television functionality module 15 through a remote connection. This connection may be wireless or wireline, and includes RF, infrared or other types of communications capabilities.

Figure 2:
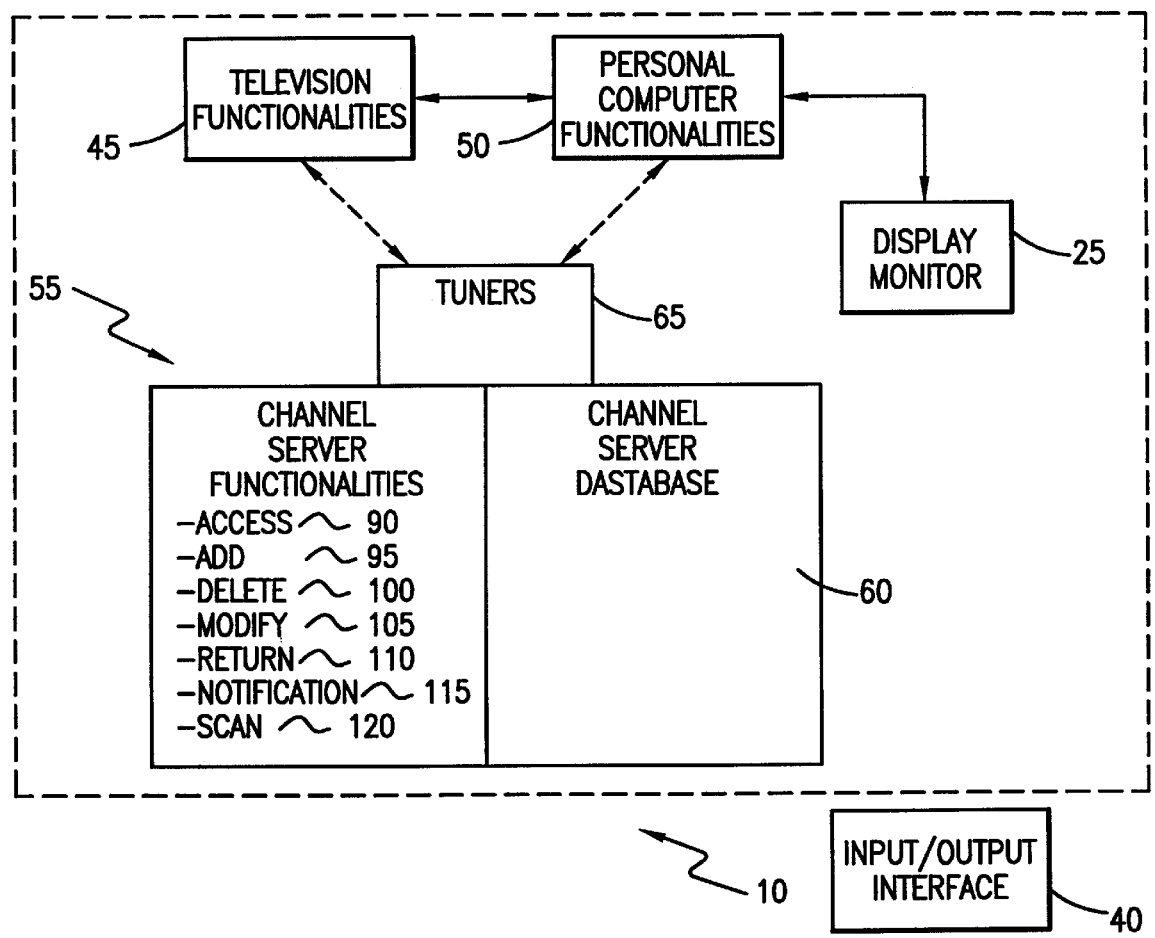
FIG. 2 is a functional block diagram of the channel server functionality of the present invention.

Referring now to FIG. 2, there is illustrated a functional block diagram of a PC/TV convergence system 10. As discussed previously, the system includes various television functionalities 45 enabling the system to interact with a display monitor 25. These types of functionalities would include channel switching, VCR programming, selection of various television functionalities, such as closed caption, stereo or mono audio feed, secondary audio programming (SAP) and control of various television parameters such as color, brightness, sound, etc. The PC functionalities would enable various PC operations, such as word processing, running programs and data manipulation.

Included with the various television 45 and PC 50 functionalities would be various channel server functionalities 55 and an associated channel server database 60 operating in conjunction with the tuner 65 of the television functionalities. The channel server database 60 comprises a listing of all broadcast channels available from the various tuner sources 65 that is accessible by, associated with or located in the PC functionalities 50. The channel server database 60 is unique in that the channels have various data and parameters associated therewith which are dynamically programmable by a user utilizing the channel server functionalities 55. Since the data and parameters may be individually set for each channel, the channels behave independently of each other.

Figure 3:
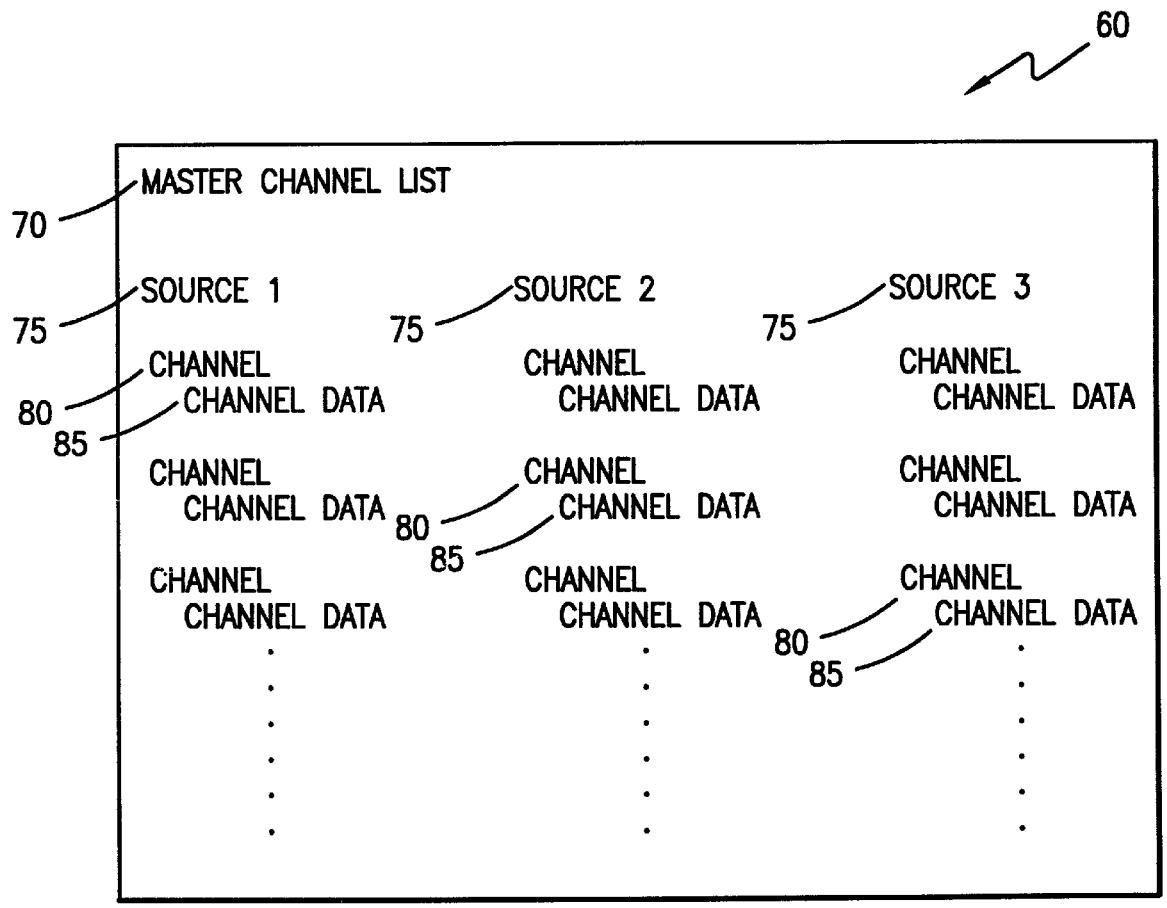
FIG. 3 is an illustration of a channel server database.

Referring now also to FIG. 3, there is provided an illustration of one embodiment of the channel server database 60 of the present invention. It should be realized that the general data structure illustrated within FIG. 3 is merely for purposes of discussion and a variety of structures enabling the dynamic association of identifiers, parameters and/or data with various broadcast channels may be accomplished according to the spirit of this invention. The channel server database 60 includes a master channel list 70 including all channels available from a variety of tuner sources 65. The master channel list 70 is further broken down into a number of source lists 75 describing the broadcast channels associated with particular sources such as an antenna, cable connection, digital satellite, etc.

Each source list 75 and the master list 70 include a plurality of broadcast channels 80 associated therewith. Each broadcast channel 80 represents an analog frequency range carrying a particular broadcast signal. Each channel 80 includes associated channel data 85 describing various information, data and parameters associated with and defining the behavior of the broadcast channel. This information, data and parameters could include, but is not limited to, the following. Each broadcast source will have an associated channel/frequency map associated therewith. The channel/frequency map comprises a table containing a given mapping of numeric representations to analog frequency ranges. This enables broadcast signals to be locked onto using a tuner source 65. Thus, for example, if a user entered numeric representation of 8, the system would lock on to the analog frequency range associated with channel 8 to provide the programming on that analog frequency range.

A channel identifier comprising the logo or alphanumeric representation that is displayed when a particular channel is accessed may be associated with each broadcast channel. The channel data 85 can also indicate the alphanumeric characters entered to call up a particular channel 80. The channel data 85 may further comprise various channel settings and functionalities to be associated with each broadcast channel 80. These settings could include the use of closed captioning, provision of stereo or mono audio, secondary audio programming (SAP) and whether or not the channel is associated with a particular user's favorite channel list. In this way, the channel behavior for each individual channel can be defined independently of other channels within the master channel list or within a source list. This provides a user with a much greater degree of control over channel behavior than current systems wherein channel behavior is essentially the same for each channel.

Referring now back to FIG. 2, the data in the channel server database 60 is manipulated via a variety of channel server functionalities 55. Through the channel server functionalities 55, a user is able to customize the behavior of individual channels. The access function 90 provides the user with access to the complete master channel list 70 and the various source lists 75. In this way, the user may access the channel listing to determine the present channel data 85 associated with a particular channel 80.

The add function 95 enables a user to add an additional channel to the master channel list 70. Additional channel data associated with the new channel 80 would then be generated. The delete function 100 enables a user to delete an entry for a particular broadcast channel 80 and its associated channel data 85. The modify function 105 enables a user to access a channel 80 and change the channel data 85 associated with the channel. The modify function 105 enables a user to change any of the channel data parameters presently associated with the broadcast channel 80 or add additional parameters not originally associated with the channel. The return function 110 provides the user with the ability to "return" the total number of channels in a master list or the total number of channels in the master list for a particular source. A notification function 115 provides a means for notifying a user that the channel list has been changed. Thus, when additional channels may have been added to a particular source or when another user has altered channel data 85 within the master channel list 70, another user may be notified of these changes such that they can access desired channels or configure channel data 85 to their own specifications.

Finally, scan functionalities 120 provide the ability to scan internal tuner sources 65 to build or rebuild source channel list entries. The build aspect entails the creation of channels for a particular source where none existed before; for example, if a cable source was provided to system previously only including antenna broadcast sources. The rebuild aspect would support the replacement of existing entries with newly tested entries and the potential removal of replaced source entries. Additionally, the rebuilding aspect could merely entail only adding new entries to previously existing source lists.

Figure 4:
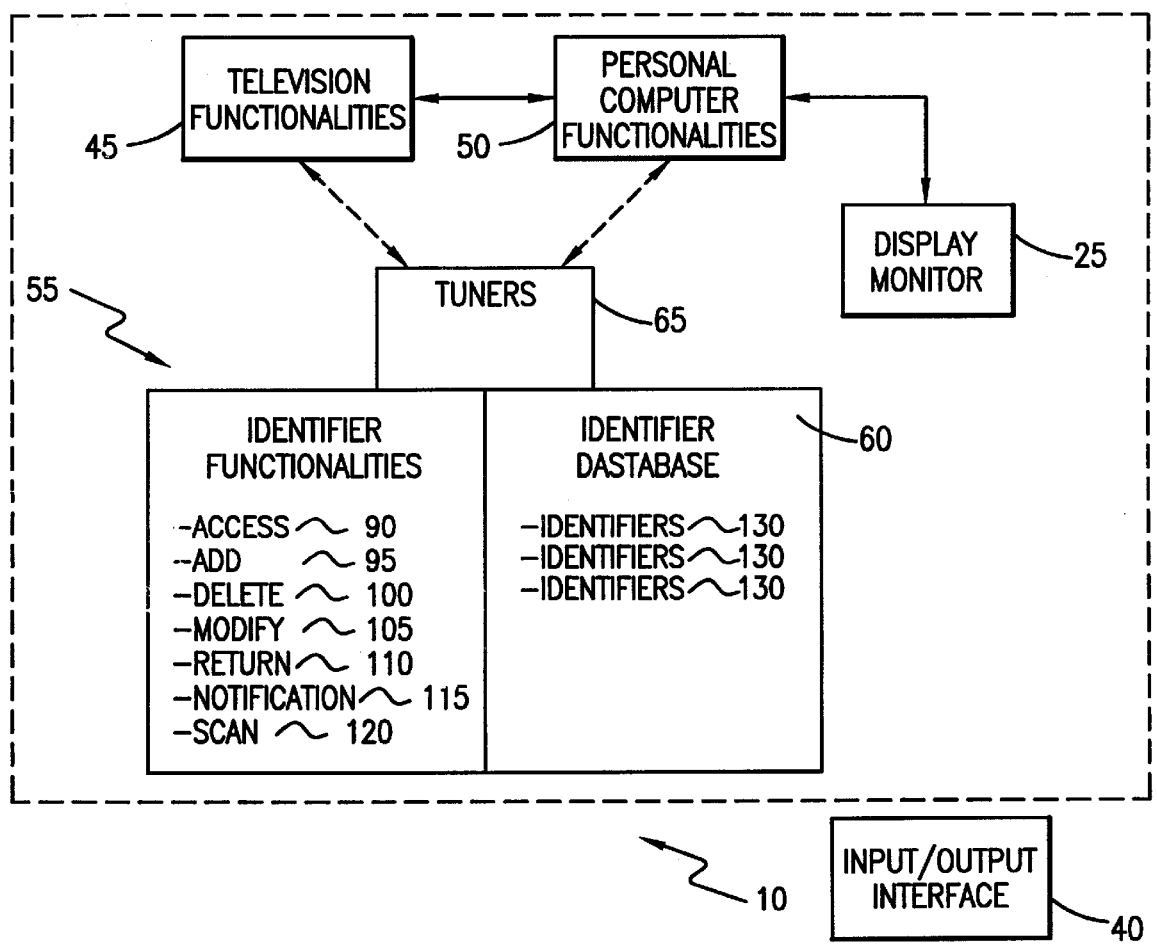
FIG. 4 is an illustration of a broader embodiment of the channel server functionality wherein any number of programmable identifiers may be controlled.

Referring now to FIG. 4, there is illustrated a further embodiment of the present invention wherein the channel server functionality and channel server database are not solely limited to information relating to tuner sources and broadcast channels associated therewith. In this embodiment, the identifier functionalities 55 and the identifier database 60 may be utilized to process a variety of dynamically programmable identifiers 130 associated with the PC 50 and television 45 functionalities. Thus, according to this aspect of the invention, any identifier associated with the television functionalities 45 could be programmed by a user to their own particular requirements. For example, the video source listing identifiers for video sources are normally labeled video 1, video 2, etc. The user could reprogram these such that they were identified as laser disc, VCR, satellite dish, etc. Any identifier or information associated with any of the television other associated convergence module device could be dynamically programmed by the user to their own desired specification.

Obviously, numerous modifications and variations are possible in view of the teachings above. For example, which a PC/TV convergence device has been discussed in detail above, the teachings of the present invention could be employed in any number of convergence devices, such as PC/game systems, PC video telephone systems, and the like. Accordingly, the present invention is not limited by the embodiments disclosed, but is capable of numerous rearrangements, modifications, and substitutions, without departing from the spirit and scope of the invention as set forth and defined by the following claims.

What is claimed is:

1. A computer system comprising:
   a display for receiving and displaying images;
   a computer, coupled to the display for executing programs and for generating images to be displayed on said display;
   a television module for providing television functionalities to the display;
   a database containing a listing of substantially all channels receivable by the television module, wherein each channel of the listing has associated therewith selectively programmable data defining independent behavior for the channel such that each channel may behave independently of other channels;
   means for the selectively programming the data relating to the channels receivable by the television module.

2. The computer system of claim 1, wherein the selectively programmable data comprises a master channel list of all channels available to the television module.

3. The computer system of claim 2, wherein the master channel list comprises channels available from each of a plurality of source.

4. The computer system of claim 2, wherein the selectively programmable data is associated in user designated groupings.

5. The computer system of claim 1, wherein the means for selectively programming further comprises means for modifying the channels within the database.

6. The computer system of claim 1, wherein the means for selectively programming further comprises means for associating a user selectable identifier with the channels.

7. The computer system of claim 1, wherein the means for selectively programming further comprises means for notifying a user of a change in the channel list.

8. The computer system of claim 1, wherein the means for selectively programming further comprises means for scanning a tuner source to build a list of channels.

9. The computer system of claim 4, wherein said user designated groups are sublists, and further comprising means for filtering said master channel list and said sublists.

10. The computer system of claim 6, wherein the means for selectively programming further comprises means for associating external system selectable data with the channels, and wherein said user selections always take precedence over external systems selections.

11. A system for dynamically defining individual broadcast channel behavior associated with integrated personal computer and television functionalities, comprising:
    a database associated with the integrated personal computer and television functionalities containing a listing of substantially all broadcast channels receivable by the television functionalities, wherein each broadcast channel has selectively programmable data uniquely defining independent behavior for each of the broadcast channels such that each channel may behave independently of other broadcast channels; and means responsive to inputs from the personal computer functionalities for selectively programming the selectively programmable data.

12. The computer system of claim 11, wherein the selectively programmable data is associated in user designated groupings.

13. The computer system of claim 11, wherein the means for selectively programming further comprises means for modifying the broadcast channels within the database.

14. The computer system of claim 11, wherein the means for selectively programming further comprises means for notifying a user of a change in the channel list.

15. The computer system of claim 11, wherein the means for selectively programming further comprises means for scanning a broadcast source to build a list of broadcast channels.

16. The computer system of claim 11, wherein the selectively programmable data comprises a master channel list of all channels available to the television module.

17. The computer system of claim 16, wherein the master channel list comprises channels available from each of a plurality of sources.

18. A system associated with an integrated personal computer and a convergence functionality module, comprising:
a database associated with the integrated personal computer and the convergence functionality module for containing selectively programmable identifiers associated with signal sources providing data to the integrated personal computer and convergence functionality; and
means responsive to inputs from the personal computer for selectively programming each of the selectively programmable identifiers for the signal sources independently of each other, wherein the selectively programmable identifiers may be established independently of each other in response to the means for selectively programming.

19. The system of claim 18, wherein the means for selectively programming further comprises means for modifying broadcast channels within the database.

20. The system of claim 18, wherein the selectively programmable identifiers may be established independently of each other in response to the means for selectively programming.

21. The system of claim 18, wherein the means for selectively programming comprises:
a data system functionality responsive to inputs from the personal computer for selectively programming each of the selectively programmable identifiers independently of each other.

22. A system for dynamically defining individual broadcast channel behavior associated with integrated personal computer and television functionalities, comprising:
a data listing associated with the integrated personal computer and television functionalities containing a listing of substantially all broadcast channels receivable by the television functionalities, wherein each broadcast channel of the listing has associated therewith selectively programmable data uniquely defining independent behavior for each of the broadcast channels such that each broadcast channel may behave independently of the other broadcast channels; and
channel service functionalities responsive to input from the personal computer functionalities for selectively programming the selectively programmable data to enable alteration of the behavior of the broadcast channels.

23. A method for dynamically defining individual broadcast channel behavior associated with integrated personal computer and television functionalities, comprising:
establishing a data listing of the broadcast channels receivable by the television functionalities, wherein the data listing includes selectively programmable data associated with each of the broadcast channels defining independent behavior for each of the broadcast channels;
selectively programming the selectively programmable data to uniquely define independent behavior for each of the broadcast channels; and
operating each of the broadcast channels according to the independent behavior defined by the selectively programmable data for the broadcast channel within the data listing.

24. The method of claim 23, wherein the step of establishing comprises the step of associating the broadcast channels in user designated groupings.

25. The method of claim 23, wherein the step of establishing comprises the step of associating the broadcast channels according to broadcast sources.

26. The method of claim 23, wherein the step of selectively programming further comprises the step of modifying the broadcast channels within the data listing.

27. The method of claim 23, wherein the step of selectively programming further comprises scanning a broadcast service to build a list of broadcast channels.

28. A method for dynamically defining identifiers associated with integrated personal computer and a convergence functionality module, comprising:
establishing a data listing of selectively programmable data for programmable identifiers associated with signal sources providing data to the integrated personal and convergence functionality identifiers;
selectively programming programmable data for the programmable identifiers to uniquely define independent behavior for each identifier; and
operating the integrated personal computer and convergence functionality module according to the established behavior defined by the programmable data for the programmable identifiers.

* * * * *